US012247699B2

(12) United States Patent
Umemoto et al.

(10) Patent No.: US 12,247,699 B2
(45) Date of Patent: Mar. 11, 2025

(54) HIGH-PRESSURE TANK

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Kazuhiko Umemoto, Nagakute (JP); Kumi Amano, Nagakute (JP); Tomoyuki Kinjo, Nagakute (JP); Hiroaki Yoneyama, Nagakute (JP); Kazuki Fujii, Toyota (JP); Masayoshi Takami, Toyota (JP); Chihiro Uchimura, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 17/894,334

(22) Filed: Aug. 24, 2022

(65) Prior Publication Data
US 2023/0070235 A1    Mar. 9, 2023

(30) Foreign Application Priority Data
Aug. 30, 2021    (JP) .................................. 2021-140307

(51) Int. Cl.
*F17C 1/06*        (2006.01)
*C25D 11/04*    (2006.01)

(52) U.S. Cl.
CPC ................ *F17C 1/06* (2013.01); *C25D 11/04* (2013.01); *F17C 2203/012* (2013.01);
(Continued)

(58) Field of Classification Search
None
See application file for complete search history.

(56) References Cited

U.S. PATENT DOCUMENTS

| 2002/0088806 A1 | 7/2002 | Takaku et al. |
| 2010/0279108 A1 | 11/2010 | Kuroyama et al. |

(Continued)

FOREIGN PATENT DOCUMENTS

| JP | H11-179791 A | 7/1999 |
| JP | 2002-188794 A | 7/2002 |

(Continued)

OTHER PUBLICATIONS

Jul. 28, 2023 Office Action issued in Japanese Patent Application No. 2021-140307.

(Continued)

*Primary Examiner* — Yan Lan
(74) *Attorney, Agent, or Firm* — Oliff PLC

(57) ABSTRACT

A high-pressure tank comprising: a resin liner for a high-pressure tank including at least one opening portion; an aluminum mouth portion attached to the opening portion; and a reinforcement layer formed on an outer surface of the liner, wherein an aluminum oxide coating is formed on a surface of the aluminum mouth portion, the aluminum oxide coating includes a porous surface layer in which columns with an average height of 10 to 100 nm are arranged in a dispersed state, an average value of a percentages of the protruding portion area of the columns in randomly sampled 400 nm square visual fields of the porous surface layer is 5.0 to 26.0%, and an average value of the numbers of the columns in randomly sampled 400 nm square visual fields of the porous surface layer is 500 to 2000.

6 Claims, 1 Drawing Sheet

(52) U.S. Cl.
CPC ............... *F17C 2203/0604* (2013.01); *F17C 2203/0607* (2013.01); *F17C 2203/0646* (2013.01); *F17C 2221/012* (2013.01)

(56) References Cited

U.S. PATENT DOCUMENTS

2016/0194779 A1* 7/2016 Umemoto ............ B29C 70/683
428/307.3
2018/0238491 A1 8/2018 Imai

FOREIGN PATENT DOCUMENTS

| | | | |
|---|---|---|---|
| JP | 2004-354039 A | 12/2004 |
| JP | 2005-133847 A | 5/2005 |
| JP | 2005-273724 A | 10/2005 |
| JP | 2006-001216 A | 1/2006 |
| JP | 2006-177480 A | 7/2006 |
| JP | 2007-203585 A | 8/2007 |
| JP | 2008-014342 A | 1/2008 |
| JP | 2008-164133 A | 7/2008 |
| JP | 2008-164134 A | 7/2008 |
| JP | 2013-199664 A | 10/2013 |
| JP | 2015-017641 A | 1/2015 |
| JP | 2015-031307 A | 2/2015 |
| JP | 2015-105659 A | 6/2015 |
| JP | 2015-169323 A | 9/2015 |
| JP | 2016-522310 A | 7/2016 |
| JP | 2018-135918 A | 8/2018 |
| JP | 2021-002631 A | 1/2021 |
| WO | 2009/078377 A1 | 6/2009 |
| WO | 2015/083845 A1 | 6/2015 |
| WO | 2019/094214 A1 | 5/2019 |

OTHER PUBLICATIONS

Oct. 26, 2023 Office Action issued in Japanese Patent Application No. 2021-140307.

* cited by examiner

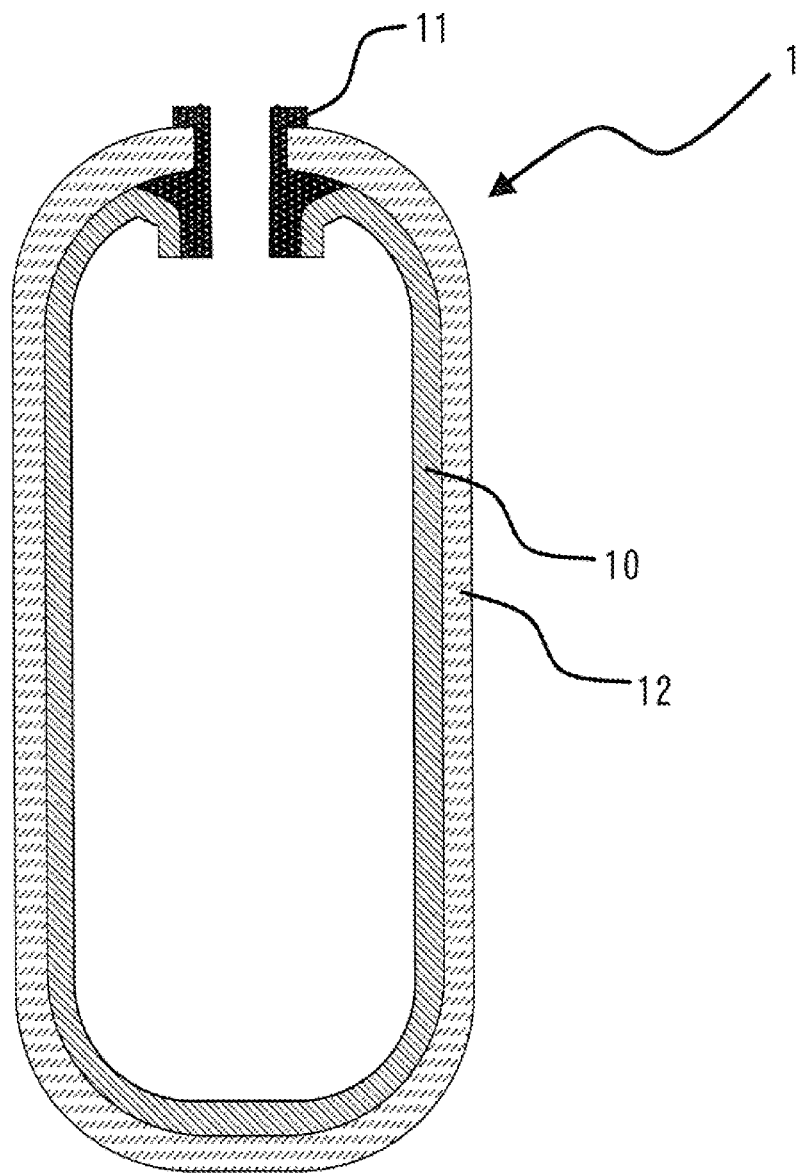

HIGH-PRESSURE TANK

BACKGROUND OF THE INVENTION

Field of the Invention

The present invention relates to a high-pressure tank.

Related Background Art

A high-pressure tank has been conventionally used as a container that contains fluid such as gas. As such a high-pressure tank, a tank of a form including a resin liner, a reinforcement layer formed on an outer periphery of the liner, and a mouth portion is widely known. In a high-pressure tank of such a form, as described in, for example, Japanese Unexamined Patent Application Publication No. 2015-031307 (JP 2015-031307 A) and Japanese Unexamined Patent Application Publication No. 2015-169323 (JP 2015-169323 A), an O-ring is used in a bonding portion between the mouth portion and the resin liner to secure airtightness between the mouth portion and the resin liner.

As described above, in the field of high-pressure tank, an O-ring has been conventionally used from the viewpoint of securing airtightness at an interface between a mouth portion and a resin liner adjacent to each other. This is due to the following reason. A metal forming the mouth portion and a resin forming the liner are materials greatly varying in characteristics such as a coefficient of linear thermal expansion. Accordingly, when both parts are directly bonded to each other, it is difficult to secure desired high level of airtightness. Meanwhile, from a viewpoint of a degree of freedom in design and the like, there is a demand for emergence of a technique that can secure a high level of airtightness for gas with a small molecular structure such as hydrogen or helium without using an O-ring in the bonding portion between the mouth portion and the resin liner.

As a technique of bonding a metal and a resin, for example, International Publication No. WO 2015/083845 (WO 2015/083845 A) discloses a method including: a surface treatment step of performing an anodization treatment on an aluminum base material to form an aluminum oxide coating including a porous surface layer on a surface of the aluminum base material, the porous surface layer being a layer in which columns with an average height of 10 to 100 nm are arranged in a dispersed state, an average value of the sums of the areas of column cross-sections in randomly sampled 400 nm square visual fields is 8000 to 128000 nm$^2$, and an average value of the numbers of the columns in randomly sampled 400 nm square visual fields is 10 to 430; and a bonding step of bonding the aluminum base material and a resin to each other via the aluminum oxide coating formed in the surface treatment step and including the porous surface layer.

SUMMARY OF THE INVENTION

The technique described in the aforementioned WO 2015/083845 A is a technique that can make bonding strength between the metal and the resin very high. However, when the technique of bonding the metal and the resin as described in WO 2015/083845 A is applied to bonding of a metal forming a mouth portion and a resin forming a liner, it is not necessarily sufficient from a viewpoint of sufficiently suppressing leakage of gas with a small molecular structure such as hydrogen or helium from an interface (bonding portion) between the metal (mouth portion) and the resin (liner).

The present invention has been made in view of the aforementioned problems of conventional techniques and an object thereof is to provide a high-pressure tank that does not necessarily have to use an O-ring in a bonding portion between a mouth portion and a resin liner and in which, even if gas to be sealed is gas with a small molecular structure such as hydrogen or helium, leakage of the gas from an interface between the mouth portion and the resin liner can be prevented at a high level and the bonding portion can have excellent airtightness.

The present inventors have conducted intensive study to achieve the above-described object, and consequently found that a high-pressure tank obtained as follows can achieve a high pressure tank that does not necessarily have to use an O-ring in a bonding portion between a mouth portion and a resin liner and in which, even if gas to be sealed is gas with a small molecular structure such as hydrogen or helium, leakage of the gas from an interface between the mouth portion and the resin liner can be prevented at a high level and the bonding portion can have excellent airtightness. The high-pressure tank includes: a resin liner for a high-pressure tank including at least one opening; an aluminum mouth portion attached to the opening portion; and a reinforcement layer formed on an outer surface of the liner, an aluminum oxide coating is formed on a surface of the aluminum mouth portion, the aluminum oxide coating includes a porous surface layer in which columns with an average height of 10 to 100 nm are arranged in a dispersed state, an average value of percentages of the protruding portion area of the columns in randomly sampled 400 nm square visual fields of the porous surface layer is 5.0 to 26.0%, and an average value of numbers of the columns in randomly sampled 400 nm square visual fields of the porous surface layer is 500 to 2000. This finding has led to the completion of the present invention.

Specifically, the present invention provides the following modes.

[1] A high-pressure tank comprising:
   a resin liner for a high-pressure tank including at least one opening portion;
   an aluminum mouth portion attached to the opening portion; and
   a reinforcement layer formed on an outer surface of the liner, wherein
   an aluminum oxide coating is formed on a surface of the aluminum mouth portion,
   the aluminum oxide coating includes a porous surface layer in which columns with an average height of 10 to 100 nm are arranged in a dispersed state,
   an average value of percentages of the protruding portion area of the columns in randomly sampled 400 nm square visual fields of the porous surface layer is 5.0 to 26.0%, and
   an average value of the numbers of the columns in randomly sampled 400 nm square visual fields of the porous surface layer is 500 to 2000.

[2] The high-pressure tank according to [1], wherein an average value of sums of circumferential lengths of column cross-sections in randomly sampled 400 nm square visual fields of the porous surface layer is 15000 to 50000 nm.

[3] The high-pressure tank according to [1] or [2], wherein the high-pressure tank is a tank for hydrogen gas.

[4] The high-pressure tank according to any one of [1] to [3], wherein the aluminum mouth portion and the liner are bonded to each other via the porous surface layer on the surface of the aluminum mouth portion.

[5] The high-pressure tank according to any one of [1] to [4], wherein a bonding portion between the aluminum mouth portion and the liner has airtightness that a He leak amount 10 seconds after the start of the test of a He Leak Method is less than $10^{-7}$ Pa·m³/s.

[6] The high-pressure tank according to any one of [1] to [5], wherein an average film thickness of a layer other than the porous surface layer in the aluminum oxide coating is 300 nm to 20 μm.

Note that, although it is not exactly clear why the above-described object can be achieved by the high-pressure tank of the present invention, the present inventors speculate as follows. Specifically, first, in the field of the high-pressure tank (high-pressure container), when gas to be confined has a small molecular structure as in a hydrogen tank, airtightness has been conventionally secured by using a physical airtight structure such as sealing using an O-ring. Note that cases where airtightness of a high-pressure tank (high-pressure container) at an interface between a metal and a resin is quantitatively evaluated have been conventionally very rare. Generally, only simple determination is performed for such airtightness at the interface. As described above, distinction at a level of a gas seal such as distinction among a liquid seal, a gas seal, and the like has not been conventionally made for an interface between a metal and a resin. Moreover, there has been no report of a technique in which a metal and a resin are directly bonded to each other to achieve a state where a leak amount of gas with a small molecular size (helium or hydrogen) from an interface between the metal and the resin is at a level close (in some cases, substantially equivalent) to a gas permeation rate of a resin material. Meanwhile, in the present invention, the aluminum oxide coating is formed on the surface of the aluminum mouth portion, the aluminum oxide coating includes the porous surface layer in which the columns with the average height of 10 to 100 nm are arranged in a dispersed state, the average value of the percentages of the protruding portion area of the columns in randomly sampled 400 nm square visual fields of the porous surface layer is 5.0 to 26.0%, and the average value of the numbers of the columns in randomly sampled 400 nm square visual fields of the porous surface layer is 500 to 2000. Since the aluminum oxide coating including the surface with the specific porous structure (uneven structure) in which the fine columns are arranged in a dispersed state as described above is formed, the resin of the liner enters the inside of the porous surface of the aluminum oxide coating from the surface side of the aluminum oxide coating at the interface of the mouth portion and the resin liner in bonding thereof. The resin and the mouth portion are thus bonded to each other without a gap in an angstrom (Å) to nanometer (nm) level and the reliability of the bonding state becomes sufficient. Moreover, according to the porous surface layer having the specific porous structure as described above, a so-called labyrinth effect can be obtained based on this structure and an interface length of the interface between the mouth portion and the resin (liner) can be dramatically increased (preferably, the interface length can be increased based on this structure such that the average value of the sums of the circumferential lengths of the column cross-sections in randomly sampled 400 nm square visual fields of the porous surface layer is 15000 to 50000 nm). Accordingly, leakage of gas from the interface between the mouth portion and the resin liner can be suppressed at a high level even if the gas is gas with a small molecular structure such as hydrogen or helium.

The present inventors speculate that the high-pressure tank of the present invention suppresses gas leakage from the metal-resin bonding interface at a high level based on the structure irrespective of use or non-use of an O-ring and achieves very high airtightness as described above. Note that, according to the present invention, since very high airtightness can be secured without using an O-ring between the mouth portion and the liner, the structure of the bonding portion between the mouth portion and the liner in the high-pressure tank can be a simple structure including no O-ring. The present inventors speculate that, when no O-ring is used in the bonding portion between the mouth portion and the liner as described above, it is possible to improve a degree of freedom in design and to reduce cost such as the material cost of the O-ring and improve an economic performance.

According to the present invention, it is possible to provide a high-pressure tank that does not necessarily have to use an O-ring in a bonding portion between a mouth portion and a resin liner and in which, even if gas to be sealed is gas with a small molecular structure such as hydrogen or helium, leakage of the gas from an interface between the mouth portion and the resin liner can be prevented at a high level and the bonding portion can have excellent airtightness.

BRIEF DESCRIPTION OF THE DRAWING

FIG. 1 is a schematic longitudinal cross-sectional view schematically illustrating a cross-sectional structure of one preferable embodiment of a high-pressure tank in the present invention.

DETAILED DESCRIPTION OF THE PREFERRED EMBODIMENTS

A preferable embodiment of the present invention is described below in detail with reference to the drawings. Note that, in the following description and drawings, the same or corresponding elements are denoted by the same reference numerals and overlapping description is omitted.

FIG. 1 is a schematic longitudinal cross-sectional view schematically illustrating a cross-sectional structure of one preferable embodiment of a high-pressure tank in the present invention. The high-pressure tank 1 illustrated in FIG. 1 includes a resin liner 10 for a high-pressure tank including at least one opening portion, an aluminum mouth portion 11 attached to the opening portion, and a reinforcement layer 12 formed on an outer surface of the liner 10.

(Resin Liner 10)

The liner 10 is a liner of a form including at least one opening portion and a storage space for storing high-pressure gas inside. Moreover, the liner 10 is a liner made of a resin. Such a resin is not limited to a particular resin and can be selected, as appropriate, depending on a fluid (gas or the like) with which the inside of the liner 10 is to be filled such that the fluid is prevented from leaking to the outside. Resins that can be used in ordinary resin molding such as injection molding and hot pressing can be preferably used as such a resin. Examples of the resins used in ordinary resin molding include thermoplastic resins such as commodity plastics, commodity engineering plastics, and super engineering plastics; thermosetting resins; and the like. One of these thermoplastic resins and thermosetting resins may be used alone or two or more thereof can be used in combination.

Known plastics and resins can be used, as appropriate, as these commodity plastics, commodity engineering plastics, super engineering plastics, and thermosetting resins and these plastics and resins are not limited to particular plastics and resins. From the viewpoint that occurrence of defect points can be further suppressed even if filling and discharging of a high-pressure gas (particularly preferably, high-pressure hydrogen) is repeated and that a molded product with excellent welding characteristics can be efficiently created, it is possible to preferably use resin compositions of polyamide resins such as polyamide 6 (nylon 6), polyamide 66 (nylon 66), polyamide 11 (nylon 11), polyamide 12 (nylon 12), and polyamide (610); polyethylene-based synthetic resin or ethylene-based synthetic resin such as high-density polyethylene (HDPE), polyethylene, and ethylene copolymers; gas barrier property materials such as polyoxymethylene (POM) and ethylene vinyl copolymer (EVOH); and the like. Among these, the resin composition of polyamide 6, the resin composition of polyamide 66, and the resin composition of polyamide 11 are particularly preferable.

Note that the resin used to form the liner 10 can be blended with various additives within such a range that the effects of the present invention are not impaired. The blending of additives brings about effects such as improvement in elastic modulus of the resin (an effect of an inorganic filler such as carbon fiber or glass fiber), polarity change (an effect of rubber, elastomer, or other resin), inhibition of degradation, and deceleration of decomposition reaction (effects of antioxidant or the like) and there can be expected further improvements in bonding strength with the mouth portion, improvements in wettability of a resin-metal interface, further improvements in interface adhesion, improvements in long-term stability (heat resistance, moist heat resistance, water resistance, and the like), and the like. These additives are not limited to particular additives, and examples thereof include surface treatment agents such as flame retardant, antioxidant, ultraviolet absorber, hydrolysis inhibitor, light stabilizer, ultraviolet absorber, antistat, lubricant, mold release agent, nucleating agent, rheology controlling agent, coloring agent, dye, antibacterial agent, and silane coupling agent; fibrous substances such as graphite, carbon-based nanofillers including carbon nano fiber and the like, glass fiber, carbon fiber, synthetic fibers including aramid fiber and the like, and natural fibers including cellulose, chitin, chitosan, and the like; inorganic fillers such as layered silicates including mica mineral, kaolin mineral, and the like, a calcium carbonate, calcium phosphate, titanium oxide, silica, whisker, alumina, boron nitride, aluminum nitride, silicon nitride, silicon carbide, diamond, and zinc oxide; and the like. One of these additives may be used alone or two or more thereof may be used in combination. Note that a blending method of these additives is not limited to a particular method and it is possible to employ a conventionally-known method such as, for example, a method in which the resin and the additive are mixed in a solvent, a method in which the resin and the additive are melt kneaded by using a single-screw or multi-screw vent-type extruder, a rubber roll mill, a Banbury mixer, or the like. When a low-viscosity thermosetting resin is used as the resin, it is also possible to mix the additive and the resin by conducting a composition forming treatment using a planetary centrifugal mixer.

(Aluminum Mouth Portion 11)

The aluminum mouth portion 11 is attached to the opening portion of the liner 10. The aluminum mouth portion 11 attached to the opening portion of the liner 10 as described above is a member that functions as an opening of the high-pressure tank 1 and that also functions as an attachment portion for attaching a pipe or a valve to a tank main body.

Moreover, the aluminum mouth portion 11 is a mouth portion in which an aluminum oxide coating is formed on a surface thereof. Such an aluminum mouth portion 11 in which the aluminum oxide coating is formed on the surface thereof can be formed by, for example, performing an anodization treatment on an aluminum base material (base material of the mouth portion).

The aluminum base material used for such an aluminum mouth portion 11 is not limited to a particular material and may be any aluminum material on which the aluminum oxide coating can be formed. For example, known pure aluminum or aluminum alloy is used. Components of the aluminum alloy are not limited to particular components, and various alloys can be used, including alloys specified in Japanese Industrial Standards (JIS). For example, it is possible to use aluminum alloys of 1000 to 8000 series specified in JIS and various aluminum alloys of die-casting grade. The aluminum alloys of 1000 series are high-purity aluminum-based alloys, and the others are alloy series containing, in addition to aluminum, copper (Al—Cu alloy series, 2000 series), manganese (Al—Mn alloy series, 3000 series), silicon (Al—Si alloy series, 4000 series), magnesium (Al—Mg alloy series, 5000 series), magnesium-silicon (Al—Mg—Si alloy series, 6000 series), zinc-magnesium (Al—Zn—Mg alloy series, 7000 series), or other metals suiting various purposes (Al—other metals alloy series, 8000 series). It is possible to use not only high-purity aluminum alloys, but also various currently used aluminum alloys. The shape of the aluminum base material used for such a mouth portion 11 is not limited to a particular shape, and it is possible to use an aluminum base material processed into a desired shape by a known metal processing method such as, for example, cutting, pressing, machining, or grinding, depending on an application of the high-pressure tank. Moreover, the aluminum base material with the desired shape may be manufactured by forging or casting.

Moreover, the aluminum oxide coating formed on the surface of the aluminum mouth portion 11 is an aluminum oxide coating as follows. The aluminum oxide coating includes a porous surface layer in which columns with an average height of 10 to 100 nm are arranged in a dispersed state, an average value of a percentage of the protruding portion area of the columns in randomly sampled 400 nm square visual fields of the porous surface layer is 5.0 to 26.0%, and an average value of the number of the columns in randomly sampled 400 nm square visual fields of the porous surface layer is 500 to 2000. Note that the "porous surface layer" in the present invention refers to a layer having an uneven structure (uneven structure in which the columns are protruding portions) formed by arranging the columns made of aluminum oxide in a dispersed state.

The aluminum oxide coating includes the porous surface layer in which the columns with the average height of 10 to 100 nm are arranged in a dispersed state. If the average height of such columns is below the lower limit, it is difficult to control the height in manufacturing and to cause the columns to sufficiently fit (bite) into the resin of the liner 10 in bonding. Meanwhile, if the average height of the columns exceeds the upper limit, a process for forming such columns takes time and the cost increases. The average height of such columns is more preferably 10 to 80 nm, particularly preferably 20 to 70 nm from the viewpoints of performance and productivity. A method of measuring the average height of the columns is described later.

Moreover, in the porous surface layer of the aluminum oxide coating, the average value of the percentages of the protruding portion area of the columns in randomly sampled 400 nm square visual fields needs to be 5.0 to 26.0%. If such an average value of the percentages of the protruding portion area is less than the lower limit, a sufficient labyrinth effect cannot be obtained by using the porous surface layer and leakage of gas from a bonding interface between the liner and the mouth portion cannot be prevented at a sufficiently high level. Meanwhile, if the average value of the percentages of the protruding portion area exceeds the upper limit, too many columns (protruding portions) are present and formation of the uneven structure is insufficient. Thus, the sufficient labyrinth effect cannot be obtained by using the porous surface layer and the leakage of gas from the bonding interface between the liner and the mouth portion cannot be prevented at a sufficiently high level also in this case. The average value of the percentages of the protruding portion area of the columns in randomly sampled 400 nm square visual fields is more preferably 10.0 to 20.0%, particularly preferably 10.0 to 18.0%, most preferably 11.0 to 17.5%. A method of measuring the average value of the percentages of the protruding portion area of the columns is described later.

In addition, in the porous surface layer of the aluminum oxide coating, the average value of the numbers of the columns in randomly sampled 400 nm square visual fields needs to be 500 to 2000. If such an average value of the numbers of the columns is below the lower limit, the surface area of a portion fitting (biting) into the resin of the liner 10 is small and it is difficult to obtain the sufficient labyrinth effect based on the uneven structure of the columns at the bonding interface. Thus, the leakage of gas from the bonding interface between the liner and the mouth portion cannot be prevented at a sufficiently high level. Meanwhile, if the average value of the numbers of the columns exceeds the upper limit, securing of a space in which the resin and the like can enter is insufficient and it is difficult to cause the resin and the like to enter the porous surface and exhibit sufficient labyrinth effect. Thus, the leakage of gas from the bonding interface between the liner and the mouth portion cannot be prevented at a sufficiently high level. Such an average value of the numbers of the columns in randomly sampled 400 nm square visual fields is more preferably 500 to 1200, even more preferably 650 to 1000, particularly preferably 670 to 900 from the viewpoints of the amount of fitting (biting) into the resin of the liner 10 and securing of the space in which the resin of the liner 10 enters. Note that a method of measuring the average value of the numbers of the columns is described later.

Moreover, in the porous surface layer of the aluminum oxide coating, an average value of the sums of circumferential lengths of column cross-sections in randomly sampled 400 nm square visual fields is preferably 15000 to 50000 nm (more preferably, 19000 to 45000 nm, particularly preferably 20000 to 40000 nm). If the average value of the sums of the circumferential lengths of the column cross-sections is below the lower limit, the column structure is slim and the strength of the column structure tends to be insufficient. Moreover, it is difficult to sufficiently obtain the so-called labyrinth effect and prevention of the leakage of gas from the bonding interface between the liner and the mouth portion at a sufficiently high level tends to be impossible. Meanwhile, if the average value of the sums of the circumferential lengths of the column cross-sections exceeds the upper limit, the size of the space formed by the columns in the porous surface layer is small. Thus, it is difficult to sufficiently obtain the labyrinth effect based on the uneven structure of the columns and prevention of the leakage of gas from the bonding interface between the liner and the mouth portion at a sufficiently high level tends to be impossible. A method of measuring the average value of the sums of the circumferential lengths of the column cross-sections is described later.

The methods of measuring various characteristics (average height of the columns and the like) and the like of the porous surface layer in the aluminum oxide coating are described below.

<Method of Measuring Average Height of Columns in Porous Surface Layer>

The average height of the columns in the porous surface layer in the aluminum oxide coating can be obtained as follows. Specifically, first, an image of a cross-section of the porous surface layer in the aluminum oxide coating is captured with a scanning electron microscopic (SEM) or a transmission electron microscope (TEM) to obtain an image (for example, SEM image or TEM image) of the cross-section of the porous surface layer. Note that the capturing of the image of the cross-section as described above is performed for five or more regions (five or more visual fields) randomly sampled from the porous surface layer. Next, the obtained SEM images or TEM images are observed to measure the average height of the columns in the porous surface layer. The following method is employed as the method of measuring such an average height of the columns in the porous surface layer.

Specifically, first, for each of images that captures 30 to 100 columns being the protruding portions and that are images of regions each having a vertical length of 365 nm and a horizontal length of 630 nm in the cross-section of the porous surface layer (images of five or more regions (five or more visual fields) randomly sampled from the porous surface layer: five or more SEM images or TEM images), a column in the porous surface layer of the aluminum oxide coating in which the distance (height) between an upper end of the column and a boundary surface with a layer other than the column is the maximum (maximum value) and a column in which the distance (height) is the minimum (minimum value) are selected, the center between the maximum value and the minimum value is taken as an average value, a normal distribution is obtained on the assumption that a difference between the average value and the maximum value (or the minimum value) is equal to three times a standard deviation ($\sigma$), and an average value of the height of the porous surface layer in the target image is obtained from the obtained normal distribution. Next, a value (average height) obtained by averaging the average values of the height of the porous surface layer in all images (aforementioned images of randomly sampled five or more regions) is calculated and the average height of the columns in the porous surface layer is thus obtained.

Note that, since the porous surface layer in the aluminum oxide coating incudes aluminum oxide (or aluminum hydroxide) as a main component and has no electrical conductivity, electrons reside on a sample surface in SEM observation and there is a risk of occurrence of a charging phenomenon (charge up). Accordingly, the surface of the porous surface layer is preferably coated with an electrically conductive material (Au, Pt, Os, C, or the like) in the SEM observation to prevent charging. Conditions in such coating are not limited to particular conditions and known conditions suitable for the measurement can be employed as appropriate. Moreover, in the SEM observation, a condition of magnification of 20000 times to 200000 times can be preferably employed. Note that the observation magnification is desirably set, as appropriate, depending on the structure of the aluminum oxide coating such that, on the surface of the porous surface layer in the aluminum oxide coating, the diameters of pores in the aluminum oxide coating can be measured and 100 or more pores can be checked in a measurement region (for example, is set to satisfy conditions such as the area of the measurement region is about 500 nm$^2$ and the like).

<Methods of Measuring Average Value of Percentages of Protruding Portion Area of Columns in Porous Surface Layer, Average Value of Numbers of Columns in Porous Surface Layer, and Average Value of Sums of Circumferential Lengths of Column Cross-Sections>

The average value of the percentages of the protruding portion area of the columns in the porous surface layer in the aluminum oxide coating, the average value of the numbers of the columns in the porous surface layer, and the average value of the sums of the circumferential lengths of the column cross-sections can be obtained as follows.

First, surface and cross-sectional images (for example, SEM images) of randomly sampled three to five regions of the porous surface layer in the aluminum oxide coating are obtained. Next, the images are loaded onto image analysis software, if necessary, are subjected to noise removal or the like, and are then converted to 8-bit images (gray scale). Then, regions to be processed (regions of randomly sampled 400 nm square visual fields) are randomly set in the gray scale images. Such setting of the processing regions is performed by randomly sampling five or more regions of 400 nm square visual fields from the images of the randomly sampled three to five regions of the porous surface layer (all gray scale images) (performed such that the total number of processing regions to be subjected to the following process is five or more). Then, a luminance threshold setting process is performed on each of the images of the processing regions. For example, a predetermined luminance or higher in an 8 bit image is selected. Next, particles selected to have luminances at or above the set threshold are subjected to a separation process. The particle separation process is carried out by any known approach. Typical examples of the approach include image segmentation methods and the like. The image segmentation methods include various methods such as morphology-based approaches used for separation of contacting objects, such as automatic threshold, edge-based approach, and Watershed transform. Specifically, for example, the particles are separated based on a Watershed segmentation process. This separation approach is an approach of automatically cutting or dividing portions in which individual particles are in contact with each other. In specific means of this approach, first, a Euclidean distance map (EDM) is created. Subsequently, ultimate eroded points (UEPs) are found in the EDM, and each UEP (ultimate eroded point, the local maximum or peak of the EDM) is dilated as much as possible, until the UEP reaches the edge of the particle, or until the UEP reaches the edge of a region of another UEP (growing). Then, the average value of the percentages of the protruding portion area of the columns in the porous surface layer, the average value of the numbers of the columns in the porous surface layer, and the average value of the sums of the circumferential lengths of the column cross-sections can be calculated based on the obtained images of all processing regions (images of the randomly sampled five or more processing regions). Note that the above-described series of the analyses can be conducted with a single piece of image analysis software or a combination of multiple pieces of image analysis software and various types of analysis processing software. Specifically, it is possible to use ImageJ (image processing software developed at the National Institutes of Health) or commercially available image analysis software.

To be more specific, for example, surface and cross-sectional SEM images of randomly sampled three to five regions of the porous surface layer in the aluminum oxide coating are captured, and each of the captured images is analyzed by using the image analysis software ImageJ. Then, each of the surface and cross-sectional SEM images of the randomly sampled three to five regions of the porous surface layer is loaded onto the image analysis software ImageJ and is converted to an 8-bit image (256 levels, gray scale) and then regions (regions of randomly sampled 400 nm square visual fields) to be processed are randomly set. Note that the setting of the processing regions is performed by randomly sampling five or more regions of 400 nm square visual fields from the images of the randomly sampled three to five regions of the porous surface layer. Then, each of the images of the processing regions is subjected to binarization and then to the Watershed segmentation process or the like to separate the particles. Next, the average value of the percentages of the protruding portion area of the columns in the porous surface layer in the aluminum oxide coating, the average value of the numbers of the columns in the porous surface layer, and the average value of the sums of the circumferential lengths of the column cross-sections are obtained based on results of the obtained images of all processing regions. As a preferable example of such a method, the following method can be given.

Specifically, first, surface and cross-sectional SEM images of randomly sampled three to five regions of the porous surface layer in the aluminum oxide coating are captured. Next, each of the captured images is subjected to noise removal and is then analyzed by using image analysis software ImageJ 1.47 (developed at the National Institutes of Health, obtained from http://rsbweb.nih.gov/ij/). Next, each image is converted to an 8-bit image (256 levels, gray scale) and then regions (regions of randomly sampled 400 nm square visual fields) to be processed are randomly set (note that the setting of the processing regions is performed by randomly sampling five or more regions of 400 nm square visual fields from the images of the randomly sampled three to five regions of the porous surface layer (all gray scale images)). In image analysis of such images of the processing regions, a binarization process is conducted first. In the luminance threshold setting process, a predetermined threshold is selected as a boundary visually recognizable as a first layer, and luminances at or above the predetermined threshold are selected from the images. Specifically, the threshold is set such that, in the 8-bit images that are converted from the SEM images and in which the first layer (surface layer) and another layer are recognizable, the luminance (for example, 150) at an end of the another layer (for example, an end of an intermediate layer in contact with the porous surface layer or, if there is no intermediate layer, an end of the aluminum base material) is employed as the threshold. Next, the particles selected to have luminances at or above the set threshold in the images of the processing regions are subjected to the separation process. In this particle separation process, the particles are separated based on the Watershed segmentation process. First, an EDM (Euclidean distance map) is created. Next, ultimate eroded points (UEPs) are found in the EDM, and each UEP (ultimate eroded point, a local maximum or peak in the EDM) is dilated as much as possible, until the UEP reaches the end (edge) of the particle, or until the UEP reaches a boundary (edge) of a region of another (adjacent) growing (expanding) UEP, and an adjacent surface (boundary surface) is thereby defined. Subsequently, the minimum value of the size of blocks to be counted is determined, and blocks with sizes not smaller than the minimum value are counted. Further, the area, outer periphery, and coordinates of each block are obtained with ImageJ. Then, the average value of the percentages of the protruding portion area of the columns in the porous surface layer, the average value of the numbers of the columns in the porous surface layer, and the average value of the sums of the circumferential lengths of the column cross-sections are calculated based on results of all obtained images (images of the randomly sampled five or more processing regions).

(1) Measurement of Average Value of Percentages of Protruding Portion Area in Columns in Randomly Sampled 400 nm Square Visual Fields of Porous Surface Layer:

First, as described above, images (for example, SEM images) of randomly sampled three to five regions on the surface of the porous surface layer are used and are each subjected to the following processes. The image is loaded onto software (ImageJ or the like) to be converted into an 8-bit image (256 levels, gray scale). In the obtained gray scale images, regions (regions of 400 nm square visual fields randomly sampled from the surface image) to be processed are randomly set (note that the setting of the processing regions is performed by randomly sampling five or more regions of 400 nm square visual fields from the gray scale images of the randomly sampled three to five regions of the porous surface layer). The images in the randomly sampled 400 nm square visual fields are binarized (threshold in this case is set to a value at which protruding portions can be selected by using a contrast in the SEM image) and are then subjected to the Watershed segmentation process (watershed process) to be divided (overlapping of the protruding portions are thereby adjusted). Then, the area of each block portions is obtained and the sum of the areas of the respective blocks is obtained to obtain the sum of the areas of the column portions formed as the protruding portions in the image of one processing region. Then, the percentage of the area of the column portions in the image of each processing region (percentage of the protruding portion area) is obtained. The percentage of the protruding portion area is thus resultantly obtained for each of the images of the randomly sampled five or more regions of 400 nm square visual fields (processing regions). Then, the average value of the percentages of the protruding portion area in all images (images of the randomly sampled five or more regions of 400 nm square visual fields) is obtained and the obtained average value is employed as the average value of the percentages of the protruding portion area of the columns in randomly sampled 400 nm square visual fields.

(2) Measurement of Average Value of Numbers of Columns in Randomly Sampled 400 nm Square Visual Fields of Porous Surface Layer:

First, as described above, images (for example, SEM images) of randomly sampled three to five regions on the surface of the porous surface layer are used and are each subjected to the following processes. The image is loaded onto software (ImageJ or the like) to be converted into an 8-bit image (256 levels, gray scale). In the obtained gray scale images, regions (regions of 400 nm square visual fields randomly sampled from the surface image) to be processed are randomly set (note that the setting of the processing regions is performed by randomly sampling five or more regions of 400 nm square visual fields from the gray scale images of the randomly sampled three to five regions of the porous surface layer). The images in the randomly sampled 400 nm square visual fields (images of the processing regions) are binarized and then subjected to the Watershed segmentation process to be divided. The total number of blocks in the image of each processing region is obtained. The total number of blocks is thus resultantly obtained for each of the images of the randomly sampled five or more regions of 400 nm square visual fields. Then, the average value of the numbers of the blocks in all images (images of the randomly sampled five or more regions (processing regions) of 400 nm square visual fields) is obtained and the obtained average value is employed as the average value of the numbers of the columns in the randomly sampled 400 nm square visual fields.

(3) Measurement of Average Value of Sums of Circumferential Lengths of Column Cross-sections in Randomly sampled 400 nm Square Visual Fields of Porous Surface Layer:

First, as described above, images (for example, SEM images) of randomly sampled three to five regions on a cross-section of the porous surface layer are used and are each subjected to the following processes. The image is loaded onto software (ImageJ or the like) to be converted into an 8-bit image (256 levels, gray scale). In the obtained gray scale images, regions (regions of 400 nm square visual fields randomly sampled from the cross-sectional image) to be processed are randomly set (note that the setting of the processing regions is performed by randomly sampling five or more regions of the 400 nm square visual fields from the gray scale images of the randomly sampled three to five regions of the porous surface layer). The images in the randomly sampled 400 nm square visual fields (images of the processing regions) are binarized and the outer peripheries of the respective blocks counted in each of the images of the processing regions are added up to obtain the sum of the circumferential lengths of the column cross-sections in the image of one processing region. The sum of the circumferential lengths of the column cross-sections is thus resultantly obtained for each of the images of the randomly sampled five or more regions of 400 nm square visual fields (processing regions). Then, the average of the sums of the circumferential lengths of the column cross-sections in all images (images of the randomly sampled five or more regions of 400 nm square visual fields) is obtained and the obtained average value is employed as the average value of the sums of the circumferential lengths of the column cross-sections in the randomly sampled 400 nm square visual fields.

The average value of the percentages of the protruding portion area of the columns in the porous surface layer in the aluminum oxide coating, the average value of the numbers of the columns in the porous surface layer, and the average value of the sums of the circumferential lengths of the column cross-sections can be obtained by employing the methods as described above.

The aluminum oxide coating formed in the aluminum mouth portion 11 may have any form as long as a specific porous surface layer as described above is formed on the outer surface (surface on the opposite side to the base material side) of the aluminum oxide coating. For example, the coating may have a form including an intermediate layer (layer between the aluminum base material and the porous surface layer) and the porous surface layer. Such a coating is obtained by performing an anodization treatment multiple times to form a layer (intermediate layer) made of an aluminum oxide coating other than the aforementioned porous surface layer and then form a specific porous surface layer as described above on the intermediate layer. Note that, as such an intermediate layer, a porous intermediate layer with an average film thickness of 300 nm to 20 μm is preferable, a porous intermediate layer with an average film thickness of 300 nm to 15 µm is more preferable, and a porous intermediate layer with an average film thickness of 300 nm to 10 µm is particularly preferable. Moreover, as such an intermediate layer, a porous intermediate layer in which fine recess portions with an average pore diameter of 5 to 50 nm (more preferably 5 to 30 nm, particularly preferably 10 to 20 nm) are formed is preferable. Moreover, as such a porous intermediate layer in which the fine recess portions are formed, an intermediate layer in which the average inter-pore distance of the fine recess portions is 5 to 90 nm (more preferably 10 to 70 nm, particularly preferably 20 to 50 nm) is more preferable. Moreover, in the porous intermediate layer in which the fine recess portions are formed, the form of such fine recess portions are not limited to a particular form. For example, any form may be employed such as a form in which the fine recess portions have such an orientation that the fine recess portions are grown in a direction perpendicular to the surface of the aluminum base material or in a direction inclined at a certain angle with respect to the surface of the aluminum base material, a form in which the fine recess portions are grown in random directions with respect to the surface of the aluminum base material and have no orientation (for example, structures such as an ant nest-like structure, a three-dimensional network structure in which the recess portion pores are entangled with each other in a three-dimensional network shape, and a random shaped structure), or a form in which the fine recess portions are straight and have no orientation. Such a porous intermediate layer in the aluminum oxide coating may be formed of multiple layers.

A method of manufacturing the aluminum mouth portion 11 including such an aluminum oxide coating is not limited to a particular method. The method described in WO 2015/083845 A can be applied, except for the point that conditions are selected as appropriate such that the porous surface layer satisfying the aforementioned conditions is manufactured. When the method described in WO 2015/083845 A is employed, those skilled in the art can change, as appropriate, conditions such as the magnitude of voltage and the treatment time depending on a desired design of the aforementioned porous surface layer and form the porous surface layer with the desired design.

As a method of manufacturing the aluminum mouth portion 11 including such an aluminum oxide coating, it is preferable to employ, for example, a method in which the aluminum base material is subjected to the anodization treatment (subjected to the anodization treatment multiple times in the case where the intermediate layer is also formed) to form the aluminum oxide coating (anodic oxide coating) including the porous surface layer on the surface of the aluminum base material.

A method of such an anodization treatment (treatment performed multiple times in some cases) is not limited to a particular method and a known anodization method can be employed as appropriate. For example, the aluminum oxide coating including the porous surface layer can be formed by conducting electrolysis in an acidic solution with the aluminum base material used as an anode and an insoluble electrode used as a cathode to anodize (anodize multiple times is some cases) the surface of the aluminum base material The electrolytic method, the cathode, the electrolytic solution, the concentration and temperature of the electrolytic solution, the current density and voltage for the electrolysis, the time of the electrolytic treatment, and the like employed in the anodization treatment are not limited to particular methods and the like and it is possible to select, as appropriate, a method and conditions for the anodization treatment by and under which the desired shape, structure, and the like of the aluminum oxide coating, that is the desired shape, structure, and the like of the porous surface layer (in addition, the desired shape, structure, and the like of the porous intermediate layer in the case where the intermediate layer is to be formed) can be formed.

The electrolytic method used in such an anodization treatment is not limited to a particular method, and, for example, it is possible to employ an electrolytic method such as a cyclic method, a constant-current method, a constant-potential method, a constant-potential pulse method, a constant-current pulse method, and the like. Moreover, the cathode used in such an anodization treatment is not limited to a particular cathode, and any cathode can be used as long as it is not a cathode that reacts with the acidic solution or has remarkably low electrical conductivity, for example. In general, it is possible to use an insoluble electric conductor plate of platinum, lead, stainless steel, carbon, or the like. Furthermore, the electrolytic solution used in such an anodization treatment is not limited to a particular electrolytic solution, and examples thereof include acidic solutions such as phosphoric acid, chromic acid, oxalic acid, and sulfuric acid solutions. One of these acidic solutions may be used or two or more thereof may be mixed and used.

Moreover, the concentration of the acidic solution used in such an anodization treatment can be selected, as appropriate, depending on conditions such as the type of the electrolytic solution to be used and the shape, structure, and the like of the porous surface layer to be formed and/or the porous intermediate layer to be formed. For example, when an aqueous sulfuric acid solution is used as the acidic solution, the concentration is preferably 0.01 to 10 mol/L. When an aqueous oxalic acid solution is used, the concentration is preferably 0.01 to 10 mol/L. Furthermore, the temperature of the acidic solution is preferably −10 to 80° C., more preferably −10 to 60° C. Conducting the anodization treatment at this temperature can facilitate formation of the aluminum oxide coating (coating formed of the porous surface layer, coating formed of the intermediate layer and the porous surface layer, or the like) on the surface of the aluminum base material. If the temperature of such an acidic solution is lower than the lower limit, formation of the columns in the porous surface layer and/or the porous intermediate layer tends to be difficult. Meanwhile, if the temperature of the acidic solution exceeds the upper limit, dissolution of the anodic oxide coating is accelerated and the formation of the columns tends to be difficult. The time of the electrolytic treatment in the anodization treatment is preferably 30 seconds to 100 minutes.

The case where the anodization treatment is performed multiple times to form the aluminum oxide coating (anodic oxide coating) including the intermediate layer and the porous surface layer is described as an example of a method that can be preferably employed as the aforementioned anodization treatment. Such a method includes the following method. For example, first, in a first-stage anodization treatment, electrolysis is conducted by using an acidic solution containing one or two or more of acidic solutions such as phosphoric acid, chromic acid, oxalic acid, and sulfuric acid solutions (more preferably, an acidic solution containing one or two of oxalic acid and sulfuric acid solutions) as the electrolytic liquid, under conditions of a concentration of the acidic solution of 0.01 to 10 mol/L, a treatment temperature of −10 to 60° C., a voltage of 0.01 to 30 V (more preferably 0.01 to 20 V), a current density of 0.002 to 2.0 A/dm$^2$, and a treatment time of 30 seconds to 100 minutes (more preferably 30 seconds to 90 minutes) to form an anodic oxide coating on the surface of the aluminum base material. Next, as the anodization treatment, electrolysis is conducted by using the aluminum base material as the anode, a platinum plate as the cathode, and an acidic solution containing one or two or more of acidic solutions such as phosphoric acid, chromic acid, oxalic acid, and sulfuric acid solutions (more preferably, an acidic solution containing one or two of oxalic acid and sulfuric acid solutions) as the electrolytic liquid, under conditions of a concentration of the acidic solution of 0.01 to 10 mol/L, a treatment temperature of −10 to 60° C., a voltage of 0.01 to 30 V (more preferably 0.1 to 30 V), a current density of 0.002 to 2.0 A/dm$^2$, and a treatment time of 30 seconds to 100 minutes (more preferably 30 seconds to 90 minutes) to form the anodic oxide coating such that the surface side of the aluminum base material becomes the porous surface layer. The mouth portion made of the aluminum base material including the intermediate layer formed of the aluminum oxide and the aluminum oxide coating (anodic oxide coating) formed of the porous surface layer can be thereby obtained. Note that, when the anodization treatment is performed multiple times, the treatment conditions are more preferably set such that (thickness of the layer formed in the first treatment)≤(thickness of the layer formed in the second treatment and beyond). This can further facilitate formation of the columns in the porous surface layer. Note that, when the intermediate layer is formed by performing the anodization treatment multiple times as described above, the intermediate layer can be formed as the porous intermediate layer including the fine recess portions, depending on the treatment conditions. Moreover, such an intermediate layer can be formed as a layer similar to the porous intermediate layer described in WO 2015/083845 A, depending on the treatment conditions.

Note that, in such an anodization treatment, it is possible to perform, as appropriate, ordinarily employed preliminary treatments (buffing, hairline finish, satin finish, patterning, and the like) and ordinarily employed pretreatment s (surface cleaning and dissolving treatments such as degreasing, etching, desmutting, and electrolytic polishing) before the anodization treatment. At least one or two or more of the degreasing treatment, etching treatment, the desmutting treatment, and the electrolytic polishing treatment is preferably performed on the front treatment surface as the pretreatment. Note that the method described in WO 2015/083845 A can be used, as appropriate, as the method of such a pretreatment.

Moreover, in such an anodization treatment, it is possible to conduct, as appropriate, ordinarily employed posttreatments (washing with water, pore sealing, and the like), after the anodization treatment in each stage. As such a posttreatment of the anodization treatment, the aluminum oxide coating on the surface of the aluminum base material is preferably subjected to a treatment using a phosphoric acid solution (phosphoric acid treatment).

As described above, the aluminum mouth portion can be obtained by performing the anodization treatment (performing the anodization treatment multiple times as appropriate in some cases) on the aluminum base material with a desired shape depending on the design of the high-pressure tank.

(Reinforcement Layer 12)

The reinforcement layer 12 is formed to cover the outer surface of the liner 10. Moreover, in the present embodiment, the reinforcement layer 12 is formed to cover the entire outer surface of the liner 10 and part of the mouth portion 11. Such a reinforcement layer 12 is not limited to a particular layer and can be a layer similar to a known layer used as a reinforcement layer for a resin liner in the field of high-pressure tank. For example, a layer made of a fiber reinforced resin, a layer made of a thermosetting resin, and the like can be used as appropriate. Moreover, such a reinforcement layer 12 is preferably the layer made of the fiber reinforced resin among these layers. For example, a carbon fiber reinforced plastic (CFRP), a glass fiber reinforced plastic (GFRP), or the like can be used, as appropriate, as such a fiber reinforced resin and the type thereof is not limited to a particular type. Among these, the carbon fiber reinforced plastic (CFRP) is preferably used from the viewpoint that it can more efficiently exhibit strength and elastic modulus capable of withstanding high pressure.

(Method of Manufacturing High-Pressure Tank)

Description is given below of a method that can be preferably used as a method of manufacturing the aforementioned high-pressure tank including the resin liner 10, the aluminum mouth portion 11 attached to the opening portion of the resin liner 10, and the reinforcement layer 12 formed on the outer surface of the liner 10.

As such a method of manufacturing the high-pressure tank, it is preferable to employ a method including: a first step of manufacturing a mouth portion attached liner in which the aluminum mouth portion 11 is attached to the opening portion of the liner 10; and a second step of forming the reinforcement layer 12 on the outer surface of the mouth portion attached liner by winding a fiber (or a fiber bundle) impregnated with a thermosetting resin in advance on an outer surface of the mouth portion attached liner and then curing the thermosetting resin by heating the thermosetting resin.

Such a first step is a step of manufacturing the mouth portion attached liner in which the aluminum mouth portion 11 is attached to the opening portion of the liner 10. As such a step, it is preferable to employ a step capable of obtaining the mouth portion attached liner (intermediate structure) of a form in which the aluminum mouth portion 11 is attached to the opening portion of the liner 10 by bonding the resin forming the liner 10 and the aluminum mouth portion 11 to each other.

A method of obtaining the mouth portion attached liner of the form in which the aluminum mouth portion 11 is attached to the opening portion of the liner 10 by bonding the resin forming the liner 10 and the aluminum mouth portion 11 to each other as described above is not limited to a particular method. It is possible to employ, as appropriate, a method of manufacturing a structure in which the resin liner 10 and the aluminum mouth portion 11 are bonded to each other by employing, as appropriate, a known method of resin molding. Such a method of resin molding may be any molding method capable of bonding the mouth portion 11 and the resin forming the liner 10 via the porous surface layer of the aluminum oxide coating formed on the surface of the aluminum mouth portion 11 and, for example, methods such as an injection molding method, a compression molding method, a melt compression bonding method, and a pressing method can be used. Among these methods, the injection molding method is preferably used. Such an injection molding method is not limited to a particular method and an ordinary injection molding method using an injection molding machine can be used.

As a method of obtaining the mouth portion attached liner by employing such an injection molding method, the following method can be preferably employed. For example, a mold for injection molding is prepared and is opened to set the aluminum mouth portion 11 formed in advance to the mold at a position where the opening portion of the liner 10 is to be formed. Then, the mold is closed and the resin in the molten state is injected to come into contact with at least part of the surface of the aluminum mouth portion 11 (surface of a portion including the porous surface layer). Next, the resin is solidified by cooling the mold, and the aluminum mouth portion 11 and the resin are thereby bonded to each other via the porous surface layer on the surface of the aluminum mouth portion 11. Thus, the mouth portion attached liner of the form in which the aluminum mouth portion 11 is attached to the opening portion of the resin liner 10 is obtained. Note that conditions of molding pressure and injection speed can be set as appropriate depending on a molding machine to be used, the type of resin, and the shape to be molded. Moreover, for other injection conditions, known conditions can be employed as appropriate depending on the type of resin to be used. Causing the molten resin to come into contact with the aluminum mouth portion 11 as described above allows the resin to enter insides of protrusions and recesses in the porous surface layer of the aluminum mouth portion 11 and, after the curing, can achieve a state where the resin forming the liner 10 sufficiently fit (bite) into the aluminum oxide coating. Thus, the aluminum mouth portion 11 and the liner 10 can be bonded to each other with no gap in an angstrom to nanometer level and an extremely high level of airtightness can be achieved at the bonding interface.

Note that the method of obtaining the mouth portion attached liner of the form in which the aluminum mouth portion 11 is attached to the opening portion of the liner 10 by bonding the resin forming the liner 10 and the aluminum mouth portion 11 to each other is not limited to the aforementioned method. For example, a step similar to the bonding step described in WO 2015/083845 A can be used as appropriate.

Moreover, the second step is a step of forming the reinforcement layer 12 on the outer surface of the mouth portion attached liner by winding the fiber (or the fiber bundle) impregnated with the thermosetting resin in advance on the outer surface of the mouth portion attached liner and then curing the thermosetting resin by heating the thermosetting resin. Such a method of forming the reinforcement layer 12 is not limited to a particular method and a known method can be employed as appropriate. A method of forming the reinforcement layer 12 by winding the fiber (or the fiber bundle) impregnated with the thermosetting resin in advance by a so-called filament winding method and then curing the thermosetting resin by heating the thermosetting resin can be preferably employed. Note that known conditions can be employed as appropriate as curing conditions of such a thermal setting resin and like. Moreover, the thermosetting resin with which the fiber used for the manufacturing of the reinforcement layer 12 is impregnated as described above is not limited to a particular resin. For example, an epoxy resin, an unsaturated polyester resin, and the like can be used. Furthermore, the method of winding the fiber impregnated with the thermosetting resin and the like are also not limited to a particular method, and publicly known methods can be employed as appropriate.

Although the preferable embodiment of the high-pressure tank in the present invention is described above with reference to FIG. 1, the high-pressure tank of the present invention is not limited to the aforementioned embodiment. For example, although the high-pressure tank of the aforementioned embodiment is formed of the resin liner 10 for a high-pressure tank, the aluminum mouth portion 11, and the reinforcement layer 12, the configuration of the high-pressure tank of the present invention is not limited to the aforementioned embodiment and the high-pressure tank may further include a protection layer on the surface of the reinforcement layer 12. A layer used as a protection layer formed on a reinforcement layer in the field of high-pressure tank can be used as appropriate as such a protection layer formed on the surface of the reinforcement layer 12. For example, a layer made of a fiber reinforced resin, a thermosetting resin, or the like can be preferably used. Such a protection layer can be also preferably manufactured by the so-called filament winding method. As described above, as long as the high-pressure tank of the present invention includes the resin liner for a high-pressure tank, the aluminum mouth portion, and the reinforcement layer, the high-pressure tank may include, as appropriate, other configurations (for example, the aforementioned protection layer, a valve attached to the mouth portion, a preliminary O-ring used by being arranged between the mouth portion and the liner from the viewpoint of obtaining even higher airtightness and the like, an O-ring used to secure airtightness between the valve and the mouth portion, and the like).

Moreover, although the liner 10 has only one opening portion in the high-pressure tank of the aforementioned embodiment, the number of the opening portion is not limited and may be two or more depending on the application. Note that, when the number of opening portions is more than one, the number of mouth portions 11 to be bonded to the opening portions is also basically more than one to match the number of opening portions.

Since the high-pressure tank described above has extremely high airtightness, the high-pressure tank is useful as a tank for hydrogen gas (high-pressure hydrogen tank) and can be preferably used as, for example, a high-pressure hydrogen tank for a fuel cell vehicle or the like.

EXAMPLES

Hereinafter, the present invention will be described more specifically based on Examples and Comparative Examples. However, the present invention is not limited to Examples below.

Examples 1 to 4 and Comparative Examples 1 and 2

In each of Examples and the like, a test piece (test piece in conformity with ISO 19095 series) in which a resin was bonded to an aluminum sample was created as described below by employing the manufacturing conditions illustrated in Table 1, the aluminum sample being a sample on which an aluminum oxide coating was formed.

Specifically, first, an aluminum sample (alloy number "A6061" in JIS standards, shape: a donut-shaped disc with a hole opened at the center) was prepared. Next, the aluminum sample was subjected to a degreasing treatment with acetone and was washed with ion-exchanged water after this degreasing treatment.

An aluminum oxide coating was formed on a surface of the aluminum sample by employing the anodization treatment conditions illustrated in Table 1 with the aluminum sample used as the anode, an aqueous solution of sulfuric acid (manufactured by Wako Pure Chemical Industries, Ltd., purity: 96 to 98%) with a concentration of 5 to 50% by weight used as the electrolytic liquid, and a platinum plate (insoluble electrode) used as the cathode. Note that, in the case where the anodization treatment was performed multiple times, each time, a posttreatment was performed each time in which the aluminum sample subjected to anodization was washed with ion-exchanged water, dried, then stirred at room temperature for 1 to 30 minutes while being immersed in a phosphoric acid solution, and then washed with water again. The anodization treatment (including the posttreatment after the treatment) was thus performed and the aluminum sample (coated aluminum sample) on which the aluminum oxide coating was formed was prepared.

Next, a disc-shaped resin was bonded to a portion of the center hole in the obtained coated aluminum sample (shape: donut-shaped disc) by injection molding using an injection molding apparatus such that the center hole (hollow portion) was closed with the resin (polyamide 6) as described below, and the test piece was formed. Specifically, first, the coated aluminum sample was set in a mold for injection molding. Then, this mold was mounted on an injection molding apparatus (C. Mobile, a small injection molding apparatus manufactured by SHINKO SELLBIC CO., LTD.), and polyamide 6 (hereinafter, abbreviated as "PA6") was injected to come into contact with a surface of the coated aluminum sample on which the aluminum oxide coating was formed (surface of a side wall portion of the center hole), under injection molding conditions of a resin temperature of 290° C. and a mold temperature of 125° C. as illustrated in Table 1, and was then cooled to a room temperature. The resin disc made of polyamide 6 was thereby bonded to the portion of the center hole of the coated aluminum sample and the test piece was obtained (test piece was obtained by bonding the resin made of polyamide 6 to the coated aluminum sample by injection molding).

sampled from the porous surface layer. In such SEM image capturing, a sample in which a surface was coated with an electrically conductive material was prepared and used to prevent occurrence of a charging phenomenon (charge up) caused by residing of electrons on the sample surface, and the measurement was performed in a condition of an observation magnification of 200000 times. Then, for each of the captured longitudinal cross-sectional images (cross-sectional SEM images that captured 30 to 100 columns being the protruding portions and that were images of regions each having a vertical length of 365 nm and a horizontal length of 630 nm, magnification: 200000 times), the maximum column height and the minimum column height in the image were selected, a value of a center between the maximum value and the minimum value was taken as an average value, a normal distribution was obtained on the assumption that the difference between the average value and the maximum value was equal to three times a standard deviation, and an average value of the height of the porous surface layer in one SEM image was obtained from the obtained normal distribution. Next, an average value of the average values of the height of the porous surface layer in all SEM images (aforementioned images of the randomly sampled five regions) was calculated and the average height of the columns was thereby obtained. The obtained results are illustrated in Table 2.

Next, surface and cross-sectional SEM images of randomly sampled three to five regions of the porous surface layer in the aluminum oxide coating were used and were each subjected to the following processes. Each image was

TABLE 1

| | Anodization treatment conditions (voltage; treatment time) | Injection molding conditions | |
|---|---|---|---|
| | | Temperature of resin (PA6) (° C.) | Temperature of mold (° C.) |
| Example 1 | 0.01 to 30.0 V; 18 min, 0.01 to 10.0 V; 7.5 min | 290 | 125 |
| Example 2 | 0.01 to 30.0 V; 22 min, 0.01 to 10.0 V; 7.5 min | 290 | 125 |
| Example 3 | 0.01 to 30.0 V; 22 min, 0.01 to 10.0 V; 12 min | 290 | 125 |
| Example 4 | 0.01 to 30.0 V; 22 min, 0.01 to 10.0 V; 9 min | 290 | 125 |
| Comp. Ex. 1 | 0.01 to 30.0 V; 20 min, 0.01 to 10.0 V; 7.5 min | 290 | 125 |
| Comp. Ex. 2 | 0.01 to 30.0 V; 22 min, 0.01 to 10.0 V; 10 min | 290 | 125 |

[Characteristic Evaluation of Test Pieces Obtained in Examples 1 to 4 and Comparative Examples 1 and 2]
<Observation of Porous Surface Layer>

The aluminum oxide coating in the coated aluminum sample before the injection molding obtained in each of Examples 1 to 4 and Comparative Examples 1 and 2 was subjected to SEM observation, and the average height of the columns forming the porous surface layer formed in each aluminum oxide coating (average height of the columns), the average value of the sums of the circumferential lengths of the column cross-sections, the average value of the percentages of the protruding portion area of the columns, and the average value of the numbers of the columns were obtained as follows.

First, the average height of the columns was determined as follows by using an SEM (product name: S-5500, manufactured by Hitachi High-Tech Corporation).

Specifically, first, SEM images of a surface of the porous surface layer of the aluminum oxide coating and SEM images of a longitudinal cross-section in a direction perpendicular to the surface were captured. Such capturing of the SEM images was performed in five regions randomly analyzed (subjected to image analysis) by using the image analysis software ImageJ to obtain the average value of the sums of the circumferential lengths of the column cross-sections, the average value of the percentages of the protruding portion area of the columns, and the average value of the numbers of the columns. Specifically, the SEM images of the randomly sampled three to five regions of the porous surface layer were used and were each subjected to the following processes. Each image was loaded onto the image analysis software ImageJ to be converted to an 8-bit image (256 levels (white was 255, black was 0), gray scale). Then, in the obtained gray scale images, regions (randomly sampled 400 nm square visual fields) to be processed were randomly set (note that the setting of the processing regions was performed by randomly sampling five regions of 400 nm square visual fields from the gray scale images of the randomly sampled three to five regions of the porous surface layer). The images of the processing regions were binarized with a threshold set for uneven interfaces in the images of the processing regions, and were then subjected to the watershed process (Watershed segmentation process) incorporated in the image analysis software ImageJ to divide (adjust) overlapping of protruding portions. The average value of the sums of the circumferential lengths of the column cross-sections, the average value of the percentages of the protruding portion area of the columns, and the average value of the numbers of columns were obtained based on the obtained results of all images.

As described above, in the measurement, first, the surface and cross-sectional SEM images of the randomly sampled three to five regions of the porous surface layer in the aluminum oxide coating were used and each image was loaded onto the image analysis software ImageJ 1.47. Next, noise reduction was preformed to obtain an image (8-bit image: gray scale) and then the 8-bit image was analyzed by using the image analysis software ImageJ 1.47. In such analysis, first, the regions to be processed (randomly sampled 400 nm square visual fields: processing regions) were randomly set in the obtained 8-bit image (the setting of the processing regions was performed by randomly sampling five regions of 400 nm square visual fields from the gray scale images (three to five images) of the randomly sampled three to five regions of the porous surface layer) and the binarization process was performed on the images of the processing regions. In the luminance threshold setting process for the images, a threshold was obtained from the luminance at a position of a boundary that could be visually recognized as the first layer, 150 was set as the threshold, and luminances of 150 or above in the 8-bit images were selected. Then, the separation process was performed on particles selected to have luminances of the set threshold or above. Such a particle separation process was performed based on the watershed process (Watershed segmentation process) incorporated in the image analysis software ImageJ 1.47 and the particles were thereby separated. Specifically, first, an EDM was created. Subsequently, UEPs were created and each UEP was dilated as much as possible, until the UEP reached the (end) edge of the particle, or until the UEP reached a boundary (edge) of a region of another (adjacent) growing (expanding) UEP to determine an adjacent surface (boundary surface). Then, a minimum value was set and blocks with sizes equal to or larger than the minimum value were counted. The area, outer periphery, and coordinates of each block were further obtained by using ImageJ. The areas, outer peripheries, and coordinates of the blocks were thus obtained for each of the images of the randomly sampled five regions of 400 nm square visual fields (five processing regions).

In the measurement of the average value of the percentages of the protruding portion area of the columns in the randomly sampled 400 nm square visual fields of the porous surface layer, first, as described above, three to five surface images randomly sampled from the surface of the porous surface layer were used and an 8-bit image (gray scale) of each of these images was obtained. Then, processing regions (regions of randomly sampled 400 nm square visual fields) were randomly set in the obtained gray scale images (the setting of the processing regions was performed by randomly sampling five regions of 400 nm square visual fields from the gray scale images of the randomly sampled three to five regions of the porous surface layer) and the images of the processing regions were binarized. Then, the Watershed segmentation process (watershed process) was performed and the areas of the respective divided block portions in each of the images of the randomly sampled regions of 400 nm square visual fields (processing regions) were obtained. Next, the sum of the areas of the respective blocks was obtained and the sum of the areas of the column portions formed as the protruding portions in the image of the processing region on the surface was obtained. Next, the percentage of the area of the column portions in the image of the processing region (percentage of the protruding portion area) was calculated by using the sum of the areas of the column portions and the percentage of the protruding portion area in the image of the processing region was obtained. Then, an average value of the percentages of the protruding portion area in all images (images of the randomly sampled five processing regions of 400 nm square visual fields) was calculated and the average value of the percentages of the protruding portion area of the columns in the randomly sampled 400 nm square visual fields was thus obtained. The obtained results are illustrated in Table 2.

Moreover, the average value of the numbers of the columns in the randomly sampled 400 nm square visual fields of the porous surface layer was obtained as follows. First, as described above, surface images of three to five regions randomly sampled from the surface of the porous surface layer were used and an 8-bit image (gray scale) of each of these images was obtained. Then, processing regions (randomly sampled regions of 400 nm square visual fields) were randomly set in the obtained gray scale images (the setting of the processing regions was performed by randomly sampling five regions of 400 nm square visual fields from the gray scale images of the randomly sampled three to five regions of the porous surface layer) and the images of the processing regions were binarized. Then, the Watershed segmentation process (watershed process) was performed and the total number of divided blocks was obtained to obtain the number of the columns in each of the images of the randomly sampled regions of 400 nm square visual fields. Then, the average value of the total numbers of the blocks in all images (images of the five randomly sampled processing regions of 400 nm square visual fields) was calculated and the average value of the numbers of the columns in the randomly sampled 400 nm square visual fields was thus obtained. The obtained results are illustrated in Table 2.

Moreover, the average value of the sums of the circumferential lengths of the column cross-sections in the randomly sampled 400 nm square visual fields of the porous surface layer was obtained as follows. First, as described above, cross-sectional images of randomly sampled three to five regions of the porous surface layer were used and an 8-bit image (gray scale) of each of these images was obtained. Then, processing regions (randomly sampled regions of 400 nm square visual fields) were randomly set in the obtained gray scale images (the setting of the processing regions was performed by randomly sampling five regions of 400 nm square visual fields from the gray scale images of the randomly sampled three to five regions of the porous surface layer) and the images of the processing regions were binarized. Then, in each processing region, outer peripheries of the respective blocks (in the cross-section) counted as described above were added up (outer peripheries of all blocks (in the cross-section) in each 400 nm square visual field were added up) to obtain the sum of the circumferential lengths of the column cross-sections in the image of the processing region. Then, the average value of the sums of the circumferential lengths of the column cross-sections in all images (images of the randomly sampled five processing regions of 400 nm square visual fields) was calculated and the average value of the sums of the circumferential lengths of the column cross-sections in the randomly sampled 400 nm square visual fields was thus obtained. The obtained results are illustrated in Table 2.

<Measurement of He Leak Amount by He Leak Method>

An He leak amount was measured by an He leak method by using each of the test pieces (injection-molded products) obtained in Examples 1 to 4 and Comparative Examples 1 and 2 to evaluate airtightness of the bonding portion between the aluminum sample and the resin in each test piece. In such measurement, first, pressure was applied to one surface of the test piece by using He as a pressure application gas at a condition of 0.5 MPa by He, and an amount of He having permeated the test piece to the other surface side was obtained with an He leak detector (ASM 340 manufactured by Pfeiffer Vacuum GmbH, minimum detectable leak rate (vacuum method): <5×10$^{-13}$ Pa·m$^3$/s). The obtained value was detected and quantified as the He leak amount (Pa·m$^3$/s). To be more specific, a test was performed as described below to allow the He leak detector to measure He having permeated the test piece and leaked from the one surface side to the other surface side of the test piece. Specifically, a front chamber and a rear chamber were formed by using the test piece as a partition (note that the front chamber was arranged on the lower side and the rear chamber was arranged on the upper side). He (gas) was introduced on the front chamber side (lower region) partitioned by the test piece to apply pressure to the one surface of the test piece (surface on the front chamber side). He (gas) having permeated the test piece and leaked toward the other surface side (surface on the rear chamber side) of the test piece was introduced into the rear chamber (upper region) and the amount of He (He leak amount) introduced into the rear chamber (gas having permeated the test piece and leaked) was measured with the He leak detector. The pressure application using He (gas) was performed in a constant-temperature bath (manufactured by ESPEC Corp.) and the temperature in the pressure application was set to room temperature. The He leak amount (Pa·m$^3$/s) 10 seconds after the start of the test (start of application of pressure of 0.5 MPa with He) was thus obtained to evaluate airtightness. The obtained results are illustrated in Table 2.

Regarding the airtightness, if the He leak amount is 10$^{-4}$ to 10$^{-1}$ Pa·m$^3$/s, liquid leaks from an interface and prevention of gas leakage at a high level is assumed to be difficult. Meanwhile, if the He leak amount is 10$^{-3}$ Pa·m$^3$/s or less, there is no leakage of liquid and, in addition, the test piece is assumed to have excellent airtightness capable of preventing gas leakage at a high level. Particularly, if the He leak amount is less than 10$^{-7}$ Pa·m$^3$/s, it is assumed that the leak amount is at a such a level that, although He infiltrates and diffuses into the resin material (PA6), the gas leakage (permeation) from the bonding surface (interface between the aluminum sample and the resin (PA6)) is absent. Accordingly, if the He leak amount is less than 10$^{-7}$ Pa·m$^3$/s, the test piece is assumed to have an even higher level of airtightness capable of preventing gas leakage at an extremely high level. Note that, when a disc (no center hole) made only of aluminum is used instead of the test piece and the He leak amount is obtained, the He leak amount is at a level of 10$^{-10}$ Pa·m$^3$/s.

TABLE 2

| | Characteristics of porous surface layer | | | | |
| --- | --- | --- | --- | --- | --- |
| | Average height of columns [nm] | Average value of percentages of protruding portion area of columns [%] | Average value of numbers of columns | Average value of sums of circumferential lengths of column cross-sections [nm] | Evaluation of airtightness He leak amount 10 seconds after start of test (Pa · m$^3$/s) |
| Example 1 | 24.0 | 10.95 | 643 | 18781 | 2.10 × 10$^{-6}$ |
| Example 2 | 16.7 | 11.54 | 700 | 20762 | 1.40 × 10$^{-9}$ |
| Example 3 | 21.7 | 13.45 | 682 | 21984 | 2.10 × 10$^{-10}$ |
| Example 4 | 16.7 | 17.08 | 1124 | 36311 | 5.5 × 10$^{-9}$ |
| Comp. Ex. 1 | 13.3 | 4.69 | 369 | 8776 | Unmeasurable (0.1<) |
| Comp. Ex. 2 | 12.7 | 26.29 | 471 | 19789 | Unmeasurable (0.1<) |

As is apparent from the results illustrated in Table 2, in the cases where: the aluminum oxide coating (anodic oxide coating) was formed on the surface of the aluminum sample of the test piece; the aluminum oxide coating included the porous surface layer in which the columns with the average height of 10 to 100 nm were arranged in a dispersed state; the average value of the percentages of the protruding portion area of the columns in the randomly sampled 400 nm square visual fields of the porous surface layer was 5.0 to 26.0%; and the average value of the numbers of the columns in the randomly sampled 400 nm square visual fields of the porous surface layer was 500 to 2000 (in the case where the test pieces obtained in Examples 1 to 4 were used), the He leak amount was 2.1×10$^{-6}$ Pa·m$^3$/s or less.

From these results, it is found that the test pieces obtained in Examples 1 to 4 could prevent the leakage of He from the bonding surface (interface) between the aluminum sample and the resin (PA6) at a sufficiently high level. Particularly, in the test pieces manufactured in Examples 2 to 4, the He leak amount was 5.5×10$^{-9}$ Pa·m$^3$/s or less and the leakage (permeation) of the gas from the bonding surface (interface between the aluminum sample and the resin (PA6)) was assumed to be absent. Accordingly, it is found that these test pieces could prevent the gas leakage at an even higher level. Meanwhile, in the case where the porous surface layer in which the columns with the average height of 10 to 100 nm were arranged in a dispersed state was formed on the surface of the aluminum sample of the test piece but the average value of the numbers of the columns in the randomly sampled 400 nm square visual fields of the porous surface layer was less than 500 and the average value of the percentages of the protruding portion area of the columns in the randomly sampled 400 nm square visual fields of the porous surface layer was outside the range of 5.0 to 26.0% (in the case where the test pieces obtained in Comparative Examples 1 and 2 were used), the He leak amount was unmeasurable (0.1<) and it was found that the test pieces of Comparative Examples 1 and 2 were inferior to the test pieces obtained in Examples 1 to 4 in terms of airtightness.

From the above results, it was found that, in the high-pressure tank including the resin liner for a high-pressure tank having at least one opening, the aluminum mouth portion attached to the opening, and the reinforcement layer, employing such a configuration that: the aluminum oxide coating is formed on the surface of the aluminum mouth portion; the aluminum oxide coating includes the porous surface layer in which the columns with the average height of 10 to 100 nm are arranged in a dispersed state; the average value of the percentages of the protruding portion area of the columns in the randomly sampled 400 nm square visual fields of the porous surface layer is 5.0 to 26.0%; and the average value of the numbers of the columns in the randomly sampled 400 nm square visual fields of the porous surface layer is 500 to 2000 can prevent leakage of gas with a small molecular structure such as hydrogen or helium from the bonding surface between the resin liner and the aluminum mouth portion attached to the opening portion at a sufficiently high level.

As described above, according to the present invention, it is possible to provide a high-pressure tank that does not necessarily have to use an O-ring in a bonding portion between a mouth portion and a resin liner and in which, even if gas to be sealed is gas with a small molecular structure such as hydrogen or helium, leakage of the gas from an interface between the mouth portion and the resin liner can be prevented at a high level and the bonding portion can have excellent airtightness. Accordingly, the high-pressure tank of the present invention is useful particularly as a high-pressure container for a fuel cell vehicle (FCV) (for example, a hydrogen tank for a FCV and the like) and the like.

REFERENCE SIGNS LIST

1: high-pressure tank
10: liner
11: aluminum mouth portion
12: reinforcement layer

What is claimed is:

1. A high-pressure tank comprising:
a resin liner for a high-pressure tank including at least one opening portion;
an aluminum mouth portion attached to the opening portion; and
a reinforcement layer formed on an outer surface of the liner, wherein
an aluminum oxide coating is formed on a surface of the aluminum mouth portion,
the aluminum oxide coating includes a porous surface layer in which columns with an average height of 10 to 100 nm are arranged in a dispersed state,
an average value of percentages of the protruding portion area of the columns in randomly sampled 400 nm square visual fields of the porous surface layer is 5.0 to 26.0%, and
an average value of numbers of the columns in randomly sampled 400 nm square visual fields of the porous surface layer is 500 to 2000.

2. The high-pressure tank according to claim 1, wherein an average value of sums of circumferential lengths of column cross-sections in randomly sampled 400 nm square visual fields of the porous surface layer is 15000 to 50000 nm.

3. The high-pressure tank according to claim 1, wherein the high-pressure tank is a tank for hydrogen gas.

4. The high-pressure tank according to claim 1, wherein the aluminum mouth portion and the liner are bonded to each other via the porous surface layer on the surface of the aluminum mouth portion.

5. The high-pressure tank according to claim 1, wherein a bonding portion between the aluminum mouth portion and the liner has airtightness that a He leak amount 10 seconds after the start of the test of a He Leak Method is less than $10^{-7}$ Pa·m$^3$/s.

6. The high-pressure tank according to claim 1, wherein an average film thickness of a layer other than the porous surface layer in the aluminum oxide coating is 300 nm to 20 μm.

* * * * *